US011082353B2

(12) United States Patent
Nayak

(10) Patent No.: US 11,082,353 B2
(45) Date of Patent: Aug. 3, 2021

(54) DOMAIN NAME SYSTEM RESPONSE SPOOFING AT CUSTOMER PREMISE EQUIPMENT DEVICE

(71) Applicant: ARRIS Enterprises LLC, Suwanee, GA (US)

(72) Inventor: Anantha Nayak, Sagar (IN)

(73) Assignee: ARRIS Enterprises LLC, Suwanee, GA (US)

( * ) Notice: Subject to any disclaimer, the term of this patent is extended or adjusted under 35 U.S.C. 154(b) by 528 days.

(21) Appl. No.: 15/265,278

(22) Filed: Sep. 14, 2016

(65) Prior Publication Data

US 2017/0093737 A1 Mar. 30, 2017

Related U.S. Application Data

(60) Provisional application No. 62/233,681, filed on Sep. 28, 2015.

(51) Int. Cl.
*G06F 15/173* (2006.01)
*H04L 12/893* (2013.01)
*H04L 29/06* (2006.01)
*H04L 29/12* (2006.01)
*H04L 29/08* (2006.01)

(52) U.S. Cl.
CPC .......... *H04L 47/40* (2013.01); *H04L 61/1511* (2013.01); *H04L 63/0281* (2013.01); *H04L 67/02* (2013.01); *H04L 69/22* (2013.01)

(58) Field of Classification Search
CPC . H04L 47/40; H04L 61/1511; H04L 63/0281; H04L 67/02; H04L 69/22
USPC ....................................................... 709/226
See application file for complete search history.

(56) References Cited

U.S. PATENT DOCUMENTS 6,829,654 B1 * 12/2004 Jungck .................... H04L 47/10
370/475
6,850,484 B1 * 2/2005 Greenspan .............. H04L 29/06
370/218

(Continued)

FOREIGN PATENT DOCUMENTS

WO 2013/068789 A1 5/2013

OTHER PUBLICATIONS

PCT Search Report & Written Opinion, Re: Application No. PCT/US2016/051699, dated Dec. 8, 2016.

*Primary Examiner* — Thu Ha T Nguyen
(74) *Attorney, Agent, or Firm* — Wenderoth, Lind & Ponack, L.L.P.

(57) ABSTRACT

Methods, systems, and computer readable media can be operable to facilitate the spoofing of domain name system requests by a customer premise equipment (CPE) device. The CPE device may detect and block a DNS (domain name system) request received from a client device, and the CPE device may generate a DNS response that includes a pre-configured redirect address. The CPE device may block an identified DNS request when the CPE device is unable to retrieve content associated with the DNS request. The CPE device may output the DNS response to the client device from which the DNS request was received, and in response, the client device may output a request on the pre-configured redirect address that is included within the DNS response. The redirect address may direct the client device to an alternate content source.

17 Claims, 5 Drawing Sheets

(56) References Cited

U.S. PATENT DOCUMENTS

| | | | |
|---|---|---|---|
| 7,003,555 B1* | 2/2006 | Jungck | H04L 29/12066 370/389 |
| 7,461,334 B1* | 12/2008 | Lu | G06Q 30/06 715/234 |
| 7,568,107 B1* | 7/2009 | Rathi | G06F 21/41 713/182 |
| 8,200,810 B2* | 6/2012 | Gagliardi | G06F 16/951 709/224 |
| 8,566,439 B2* | 10/2013 | Saha | H04L 41/0681 709/224 |
| 8,954,603 B2* | 2/2015 | Horibuchi | H04L 29/12367 709/238 |
| 9,762,618 B2* | 9/2017 | Goldstein | G06F 21/6218 |
| 10,505,985 B1* | 12/2019 | Walter | H04L 61/6009 |
| 2001/0047415 A1* | 11/2001 | Skene | H04L 67/1027 709/226 |
| 2002/0009079 A1* | 1/2002 | Jungck | H04L 63/0263 370/389 |
| 2002/0046170 A1* | 4/2002 | Gvily | G06F 21/31 705/42 |
| 2002/0056053 A1* | 5/2002 | Vine | H04L 43/0811 714/4.1 |
| 2002/0065938 A1* | 5/2002 | Jungck | H04L 47/19 709/246 |
| 2003/0055979 A1* | 3/2003 | Cooley | H04L 29/1282 709/227 |
| 2003/0093523 A1* | 5/2003 | Cranor | H04L 61/1552 709/225 |
| 2004/0015584 A1* | 1/2004 | Cartmell | H04L 29/12009 709/225 |
| 2005/0066041 A1* | 3/2005 | Chin | H04L 29/12594 709/228 |
| 2005/0235044 A1* | 10/2005 | Tazuma | H04L 29/12066 709/217 |
| 2005/0262104 A1* | 11/2005 | Robertson | H04L 41/022 |
| 2006/0174001 A1* | 8/2006 | Zhu | H04L 63/1441 709/225 |
| 2006/0174028 A1* | 8/2006 | Zhu | H04L 63/1408 709/232 |
| 2007/0067416 A1* | 3/2007 | Gajda | H04L 63/10 709/217 |
| 2007/0250468 A1* | 10/2007 | Pieper | G06F 17/3089 |
| 2007/0250626 A1* | 10/2007 | Phan | H04L 61/303 709/225 |
| 2008/0002676 A1* | 1/2008 | Wiley | H04L 43/0852 370/356 |
| 2008/0016233 A1* | 1/2008 | Schneider | H04L 29/12066 709/230 |
| 2008/0049630 A1* | 2/2008 | Kozisek | H04L 41/0823 370/250 |
| 2008/0049640 A1* | 2/2008 | Heinz | H04L 43/06 370/252 |
| 2008/0052387 A1* | 2/2008 | Heinz | H04L 67/22 709/223 |
| 2008/0177994 A1* | 7/2008 | Mayer | G06F 9/4418 713/2 |
| 2008/0201401 A1* | 8/2008 | Pugh | H04L 29/12349 709/201 |
| 2008/0235383 A1* | 9/2008 | Schneider | H04L 29/12594 709/229 |
| 2009/0089426 A1* | 4/2009 | Yamasaki | H04L 63/0236 709/225 |
| 2009/0164661 A1* | 6/2009 | Kim | H04L 67/1036 709/238 |
| 2009/0187970 A1* | 7/2009 | Mower | H04L 43/10 726/3 |
| 2009/0262741 A1* | 10/2009 | Jungck | H04L 29/12066 370/392 |
| 2010/0174775 A1* | 7/2010 | Saiki | H04L 67/06 709/203 |
| 2010/0186079 A1* | 7/2010 | Nice | H04L 61/1511 726/14 |
| 2012/0099429 A1* | 4/2012 | Ludwig | H04L 43/028 370/235 |
| 2012/0151249 A1* | 6/2012 | Swan | G06F 11/1443 714/4.11 |
| 2012/0198043 A1* | 8/2012 | Hesketh | H04L 67/2842 709/223 |
| 2012/0254429 A1* | 10/2012 | Feng | H04L 67/2814 709/225 |
| 2012/0290724 A1* | 11/2012 | Noro | H04L 61/303 709/225 |
| 2012/0303808 A1* | 11/2012 | Xie | H04L 63/101 709/225 |
| 2013/0036468 A1* | 2/2013 | Georgiev | H04L 61/1511 726/23 |
| 2013/0132366 A1* | 5/2013 | Pieper | G06F 17/30867 707/710 |
| 2013/0179954 A1* | 7/2013 | Bidare | H04L 63/18 726/7 |
| 2013/0198744 A1* | 8/2013 | Zimmerman | G06F 9/45558 718/1 |
| 2013/0254423 A1* | 9/2013 | George, IV | H04L 61/1511 709/238 |
| 2013/0275570 A1* | 10/2013 | Treuhaft | H04L 61/1511 709/223 |
| 2013/0336221 A1* | 12/2013 | Damola | H04L 29/12066 370/328 |
| 2013/0346564 A1* | 12/2013 | Warrick | H04L 65/60 709/219 |
| 2014/0259093 A1* | 9/2014 | Narayanaswamy | H04L 63/0272 726/1 |
| 2014/0297863 A1* | 10/2014 | Zhu | H04L 47/70 709/225 |
| 2015/0207812 A1* | 7/2015 | Back | H04L 63/1441 726/23 |
| 2015/0256508 A1* | 9/2015 | Townsend | H04L 61/20 709/245 |
| 2016/0006693 A1* | 1/2016 | Salcedo | H04L 63/0236 726/1 |
| 2016/0036848 A1* | 2/2016 | Reddy | H04L 61/1511 726/22 |
| 2016/0315910 A1* | 10/2016 | Kaufman | H04L 63/029 |
| 2017/0006059 A1* | 1/2017 | Meulenhoff | H04L 63/1458 |
| 2017/0093737 A1* | 3/2017 | Nayak | H04L 67/02 |
| 2017/0366983 A1* | 12/2017 | Gunasekara | H04W 24/08 |
| 2017/0374015 A1* | 12/2017 | Siba | H04L 61/6059 |
| 2018/0234313 A1* | 8/2018 | Cohen | H02J 13/00 |
| 2018/0253415 A1* | 9/2018 | Halai | G06F 17/30861 |
| 2018/0295134 A1* | 10/2018 | Gupta | H04L 63/10 |
| 2019/0014083 A1* | 1/2019 | Xu | G06F 16/955 |
| 2020/0053162 A1* | 2/2020 | Vajravel | H04L 67/38 |

\* cited by examiner

DOMAIN NAME SYSTEM RESPONSE SPOOFING AT CUSTOMER PREMISE EQUIPMENT DEVICE

CROSS REFERENCE TO RELATED APPLICATION

This application is a non-provisional application claiming the benefit of U.S. Provisional Application Ser. No. 62/233,681, entitled "DNS Spoofing and Troubleshooter," which was filed on Sep. 28, 2015, and is incorporated herein by reference in its entirety.

TECHNICAL FIELD

This disclosure relates to spoofing a domain name system response.

BACKGROUND

Typically, web browsers or other applications running at a client device may do a domain name system (DNS) request before sending out a HTTP request for a domain (e.g., web URL (uniform resource locator) or other source identifier). The request for content or other services may not result in a response when a CPE (customer premise equipment) device (e.g., gateway device, modem, access device, etc.) receiving the request is unable to access the Internet or other network. Generally, when Internet access is unavailable to a CPE device, the CPE device is unable to reach a DNS server, and thus unable to generate a proper response to the DNS request. Failure of DNS will typically cause the browser or other application running at the client device to refrain from sending an HTTP request. Without a response to the DNS request being received at the client device, the client device will not make an attempt to troubleshoot the issue by outputting an HTTP request. Therefore, a need exists for systems and methods enabling a redirect of a client device from which a DNS request is received when the receiving CPE device is unable to reach an associated DNS server.

BRIEF DESCRIPTION OF THE DRAWINGS

Like reference numbers and designations in the various drawings indicate like elements.

DETAILED DESCRIPTION

Figure 1:
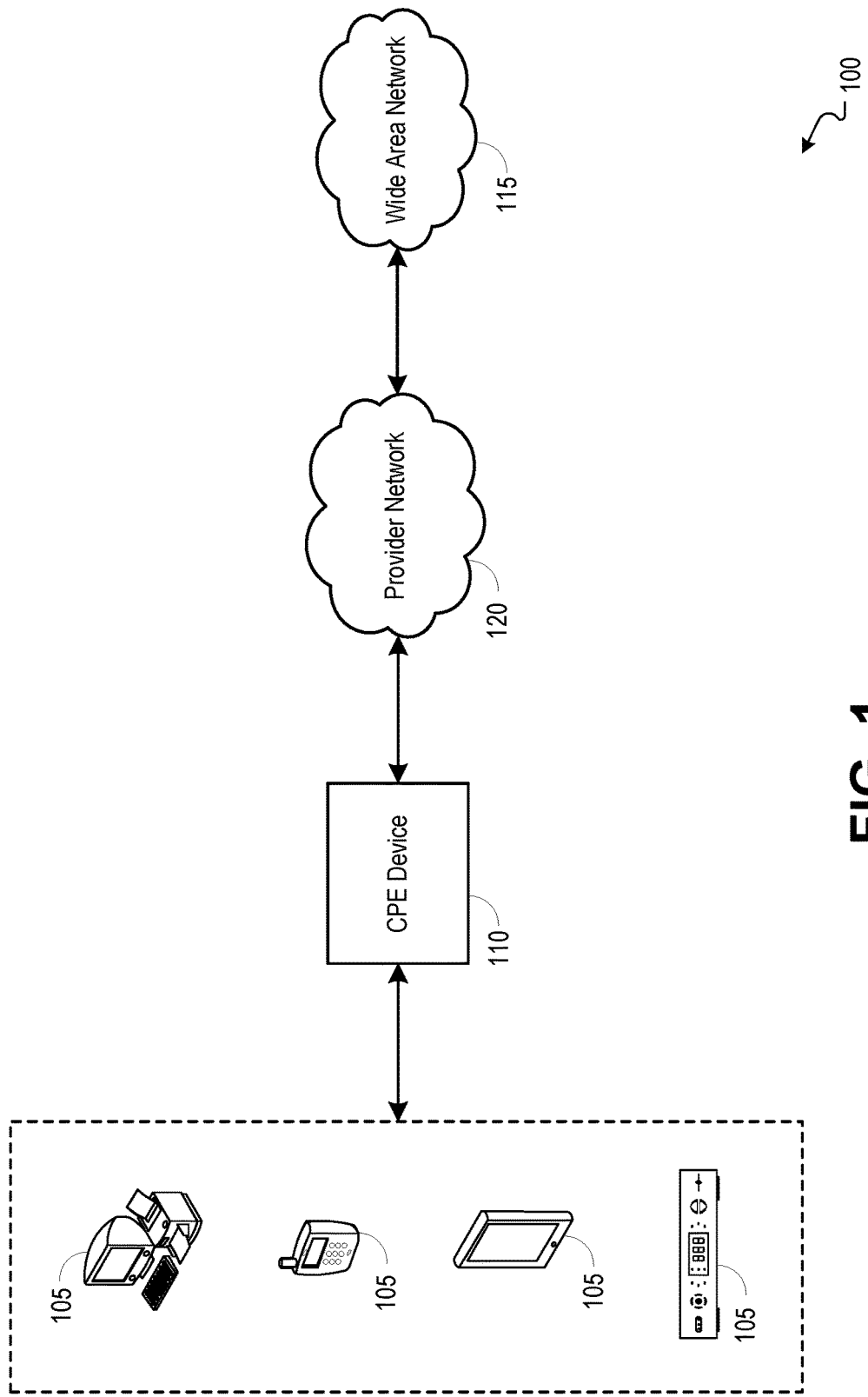
FIG. 1 is a block diagram illustrating an example network environment operable to facilitate the spoofing of domain name system requests by a customer premise equipment device.

It is desirable to improve upon methods and systems for redirecting a client device from which a DNS (domain name system) request is received. Methods, systems, and computer readable media can be operable to facilitate the spoofing of domain name system requests by a customer premise equipment (CPE) device. The CPE device may detect and block a DNS request received from a client device, and the CPE device may generate a DNS response that includes a pre-configured redirect address. The CPE device may block an identified DNS request when the CPE device is unable to retrieve content associated with the DNS request. The CPE device may output the DNS response to the client device from which the DNS request was received, and in response, the client device may output a request on the pre-configured redirect address that is included within the DNS response. The redirect address may direct the client device to an alternate content source.

An embodiment of the invention described herein may include a method comprising: (a) receiving, at a customer premise equipment device, a domain name system request from a client device; (b) blocking the domain name system request at the customer premise equipment device; (c) extracting information from the domain name system request; (d) using the information extracted from the domain name system request to generate a domain name system response; (e) retrieving a redirect address; (f) inserting the redirect address into the domain name system response; and (g) outputting the domain name system response to the client device.

According to an embodiment of the invention, the domain name system request is blocked at the customer premise equipment device in response to determining that a domain name system server associated with the domain name system request cannot be reached by the customer premise equipment device.

According to an embodiment of the invention, the domain name system response comprises an Internet protocol packet, and the redirect address is input within an answers field of the Internet protocol packet.

According to an embodiment of the invention, the redirect address is pre-configured at the customer premise equipment device and is retrieved from storage at the customer premise equipment device.

According to an embodiment of the invention, the method described herein further comprises, after outputting the domain name system response to the client device, receiving an HTTP request from the client device, wherein the HTTP request is received on the redirect address.

According to an embodiment of the invention, the information extracted from the domain name system request comprises an identification of a transport protocol associated with the domain name system request, and generating the domain name system response comprises: (a) adding an Internet protocol packet to a socket buffer; and (b) adding a packet header to the Internet protocol packet based on the transport protocol associated with the domain name system request.

According to an embodiment of the invention, generating the domain name system response further comprises, adjusting a checksum of the Internet protocol packet based on the transport protocol associated with the domain name system request.

An embodiment of the invention described herein may include an apparatus comprising: (a) one or more interfaces configured to be used to receive a domain name system request from a client device; (b) one or more modules configured to: (i) block the domain name system request; (ii) extract information from the domain name system request; (iii) use the information extracted from the domain name system request to generate a domain name system response; (iv) retrieve a redirect address; and (v) insert the redirect address into the domain name system response; and (c) wherein the one or more interfaces are further configured to be used to output the domain name system response to the client device.

According to an embodiment of the invention, the domain name system request is blocked in response to determining that a domain name system server associated with the domain name system request cannot be reached.

According to an embodiment of the invention, the domain name system response comprises an Internet protocol packet, and the redirect address is input within an answers field of the Internet protocol packet.

According to an embodiment of the invention, the one or more interfaces are further configured to be used to, after outputting the domain name system response to the client device, receive an HTTP request from the client device, wherein the HTTP request is received on the redirect address.

According to an embodiment of the invention, the information extracted from the domain name system request comprises an identification of a transport protocol associated with the domain name system request, and generating the domain name system response comprises: (a) adding an Internet protocol packet to a socket buffer; and (b) adding a packet header to the Internet protocol packet based on the transport protocol associated with the domain name system request.

According to an embodiment of the invention, generating the domain name system response further comprises, adjusting a checksum of the Internet protocol packet based on the transport protocol associated with the domain name system request.

An embodiment of the invention described herein may include one or more non-transitory computer readable media having instructions operable to cause one or more processors to perform the operations comprising: (a) receiving, at a customer premise equipment device, a domain name system request from a client device; (b) blocking the domain name system request at the customer premise equipment device; (c) extracting information from the domain name system request; (d) using the information extracted from the domain name system request to generate a domain name system response; (e) retrieving a redirect address; (f) inserting the redirect address into the domain name system response; and (g) outputting the domain name system response to the client device.

According to an embodiment of the invention, the domain name system request is blocked at the customer premise equipment device in response to determining that a domain name system server associated with the domain name system request cannot be reached by the customer premise equipment device.

According to an embodiment of the invention, the domain name system response comprises an Internet protocol packet, and the redirect address is input within an answers field of the Internet protocol packet.

According to an embodiment of the invention, the redirect address is pre-configured at the customer premise equipment device and is retrieved from storage at the customer premise equipment device.

According to an embodiment of the invention, the instructions are further operable to cause one or more processors to perform the operations comprising, after outputting the domain name system response to the client device, receiving an HTTP request from the client device, wherein the HTTP request is received on the redirect address.

According to an embodiment of the invention, the information extracted from the domain name system request comprises an identification of a transport protocol associated with the domain name system request, and generating the domain name system response comprises: (a) adding an Internet protocol packet to a socket buffer; and (b) adding a packet header to the Internet protocol packet based on the transport protocol associated with the domain name system request.

According to an embodiment of the invention, generating the domain name system response further comprises, adjusting a checksum of the Internet protocol packet based on the transport protocol associated with the domain name system request.

FIG. 1 is a block diagram illustrating an example network environment 100 operable to facilitate the spoofing of domain name system requests by a customer premise equipment device. In embodiments, video, voice, and/or data services may be delivered to one or more client devices 105. Client devices 105 may include televisions, mobile devices, tablets, computers, set-top boxes (STB), telephones (e.g., voice over Internet protocol (VoIP) telephones), gaming devices, and any other device operable to receive video, voice, and/or data services. It should be understood that various data, multimedia, and/or voice services may be delivered to the client devices 105, including but not limited to, live or broadcast television, video-on-demand (VoD) content, pay-per view content, recorded content (e.g., DVR (digital video recorder) content), audio-only content, streaming content, and others.

In embodiments, one or more services delivered to a subscriber premises may be received and forwarded to one or more client devices 105 by a customer premise equipment (CPE) device 110 such as a gateway device, an access device, a STB, or any other device configured to route communications from an upstream network to one or more connected or associated devices. For example, a CPE device 110 may include a gateway device (e.g., residential gateway, multimedia gateway, etc.), a router, a wireless network extender, or any other device configured to route communications to and from one or more client devices 105. It should be understood that the devices shown in FIG. 1 may be integrated. For example, a client device 105 may be embedded with an access module (e.g., modem) of a CPE device 110.

In embodiments, multiple services (e.g., video, voice, and/or data services) may be delivered from a wide-area network (WAN) 115 to a CPE device 110 through a connection between the CPE device 110 and a provider network 120. The provider network 120 may include an optical network, hybrid fiber coaxial (HFC) network, digital subscriber line (DSL) network, twisted-pair, mobile network, high-speed data network, MoCA (multimedia over coax alliance) network, and others.

In embodiments, multiple services may be delivered from a CPE device 110 to one or more client devices 105 through a local network. The local network may include a local area network (LAN), wireless local area network (WLAN), personal area network (PAN), MoCA network, mobile hotspot network, and others. The local network may be provided at a subscriber premises by the CPE device 110 or one or more other access points within the premises. It will be appreciated by those skilled in the relevant art that delivery of the multiple services over the local network may be accomplished using a variety of standards and formats.

An application (e.g., web browser or other application that is configured to access the Internet or other upstream network) running at a client device 105 may be configured to output a DNS (domain name system) query/request before sending out an HTTP (hyper-text transfer protocol) request for a desired domain. For example, this DNS request may be received and processed by an associated CPE device 110. However, if a connection between the CPE device 110 and the Internet (or other upstream network) is broken, the CPE device 110 may become unable to respond to the DNS request. In embodiments, the CPE device 110 may be configured to block DNS requests according to a certain set of rules (e.g., firewall system (iptables)), and the CPE device 110 may respond to the blocked request with a DNS response that includes a pre-configured redirect address (e.g., IP (Internet protocol) address, domain name, etc.). For example, the CPE device 110 may block DNS requests according to one or more parameters stored at the CPE device 110 within a firewall system (e.g., iptables) when the CPE device 110 has determined that a connection with the Internet or other network is broken, or otherwise when a DNS server associated with the DNS request cannot be reached by the CPE device 110.

In embodiments, the redirect address that is added to the DNS response by the CPE device 110 may include an address that is associated with a server that is reachable by the CPE device 110 and/or the client device 105 from which the DNS request was received. For example, the server may be a server that is internal to the CPE device 110 or may be a server that is external to the CPE device 110. The DNS response created by the CPE device 110 may redirect the client device 105 to a certain piece of content or alternate content source. For example, the server may include informational and/or troubleshooting content that explains and/or troubleshoots a current broken connection between the CPE device 110 and the Internet or other network.

The CPE device 110 may extract information from the DNS request to be used in the generation of the DNS response, and the CPE device 110 may output the DNS response to the client device 105 from which the DNS request was received. The DNS response may direct the client device 105 to attempt to recover a piece of content from a certain server that is identified by the DNS response. After receiving the DNS response from the CPE device 110, the client device 105 may output a request for content from the server according to the information contained within the DNS response. For example, the client device 105 may output an HTTP (hyper-text transfer protocol) request (packet) on an IP address that is identified by the DNS response.

The CPE device 110 may respond to a DNS request by generating and outputting a DNS response that includes a redirect address that facilitates a retrieval of information/content by a requesting client device 105. The retrieval of the DNS request and the generation and output of the DNS response by the CPE device 110 may be accomplished without adding additional overhead on the operating system as no new tasks or procedures are created. Rather, the CPE device 110 uses an existing firewall system (e.g., iptables) framework to achieve the goal.

Figure 2:
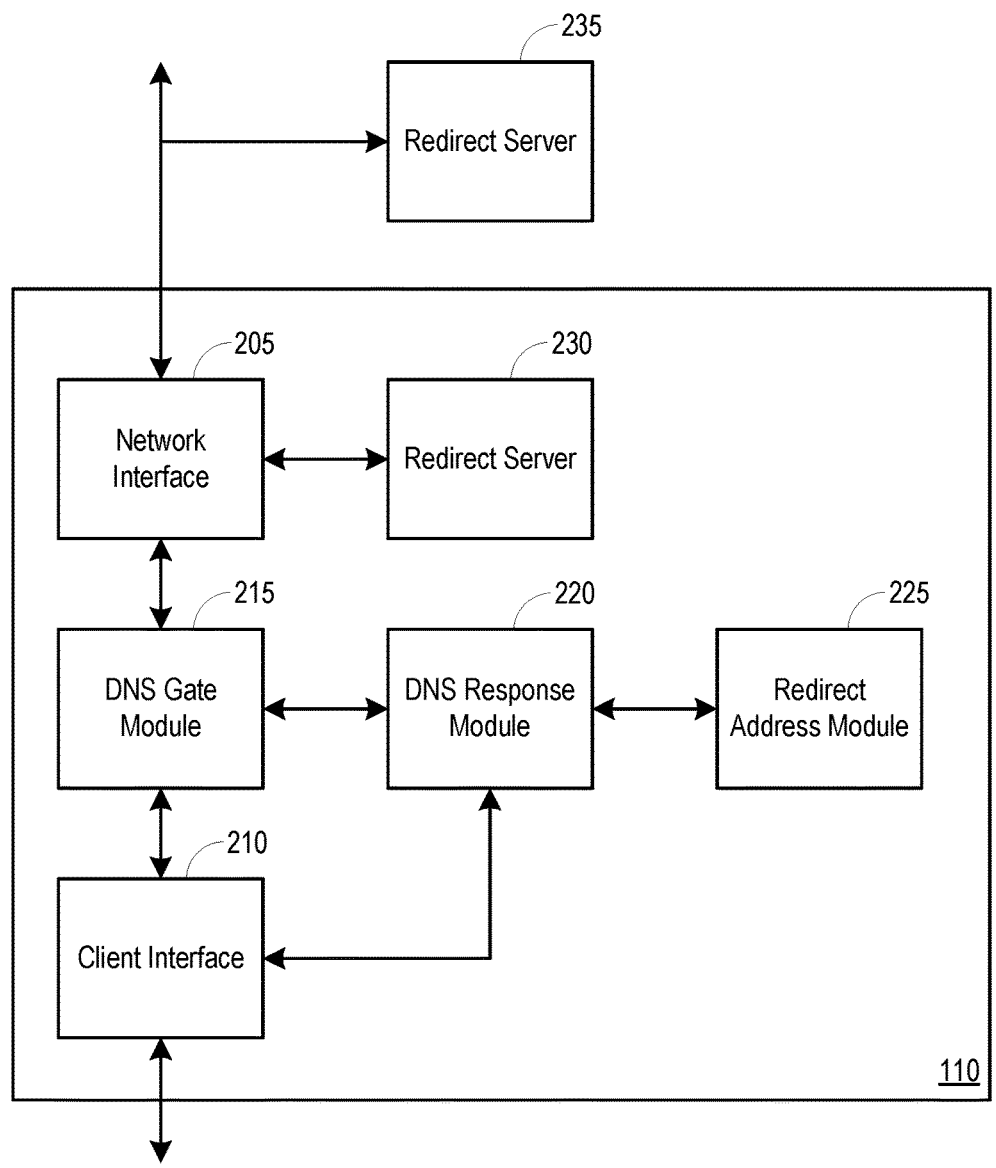
FIG. 2 is a block diagram illustrating an example CPE device operable to facilitate the spoofing of domain name system requests by a customer premise equipment device.

FIG. 2 is a block diagram illustrating an example CPE device 110 operable to facilitate the spoofing of domain name system requests by a customer premise equipment device. The CPE device 110 may include a network interface 205, one or more client interfaces 210, a DNS gate module 215, a DNS response module 220, a redirect address module 225, and optionally, a redirect server 230. The CPE device 110 may receive one or more services and/or communications from one or more other routing or access devices or upstream network elements (e.g., WAN 115 of FIG. 1, redirect server 235, etc.) through the network interface 205, and the CPE device 110 may forward one or more services and/or communications to one or more client devices 105 of FIG. 1 through the client interface(s) 210.

In embodiments, the CPE device 110 may receive a DNS request from a client device (e.g., client device 105 of FIG. 1) through a client interface 210. The DNS gate module 215 may be configured to block DNS requests according to a certain set of rules (e.g., firewall system (iptables)). For example, the DNS gate module 215 may recognize and block DNS requests according to one or more parameters stored at the CPE device 110 within a firewall system (e.g., iptables) when the CPE device 110 has determined that a connection with the Internet or other network is broken or when the CPE device 110 is otherwise unable to retrieve content identified by the DNS request.

In response to a blocked DNS request, the DNS response module 220 may be configured to generate a DNS response that includes a pre-configured redirect address (e.g., IP (Internet protocol) address, domain name, etc.). In embodiments, the DNS response module 220 may retrieve a pre-configured redirect address from the redirect address module 225. The redirect address that is added to the DNS response by the DNS response module 220 may include an address that is associated with a server that is reachable by the CPE device 110 and/or the client device 105 from which the DNS request was received. For example, the server may be a server that is internal to the CPE device 110 (e.g., redirect server 230) or may be a server that is external to the CPE device 110 (e.g., redirect server 235). The DNS response created by the DNS response module 220 may redirect the client device 105 to a certain piece of content. For example, the server may include informational and/or troubleshooting content that explains and/or troubleshoots a current broken connection between the CPE device 110 and the Internet or other network.

In embodiments, the DNS response module 220 may extract information from the DNS request to be used in the generation of the DNS response, and the DNS response module 220 may output the DNS response to the client device 105 from which the DNS request was received (e.g., through a client interface 210). The DNS response may direct the client device 105 to attempt to recover a piece of content from a certain server that is identified by the DNS response. After receiving the DNS response from the CPE device 110, the client device 105 may output a request for content from the server according to the information contained within the DNS response. For example, the client device 105 may output an HTTP (hyper-text transfer protocol) request (packet) on an IP address that is identified by the DNS response.

Figure 3:
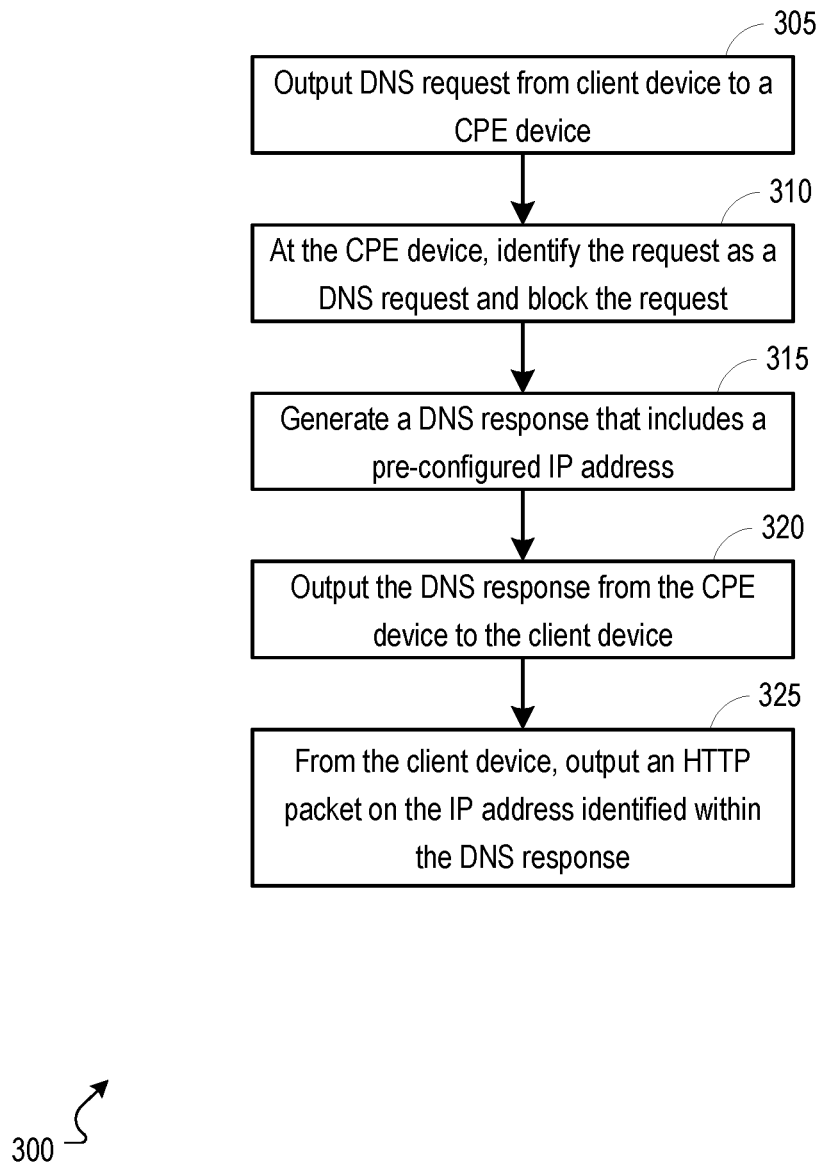
FIG. 3 is a flowchart illustrating an example process operable to facilitate the redirect of a DNS request to an HTTP request over a pre-configured IP address.

FIG. 3 is a flowchart illustrating an example process 300 operable to facilitate the redirect of a DNS request to an HTTP request over a pre-configured IP address. The process 300 can begin at 305, when a DNS (domain name system) request is output from a client device (e.g., client device 105 of FIG. 1) to a CPE device (e.g., CPE device 110 of FIG. 1 such as a gateway device, STB, standalone modem, or other device having an embedded modem). In embodiments, the DNS request may include a content source identifier (e.g., a domain name) and may be received at the CPE device through a client interface 210 of FIG. 2.

At 310, the CPE device may identify the received request as a DNS request and may block the request. The request may be identified as a DNS request, for example, by the DNS gate module 215 of FIG. 2. In embodiments, one or more parameters of the received DNS request (e.g., packet) may be checked against one or more packet parameters that are designated for a packet that is to be blocked. For example, a table of packet parameters (e.g., parameters stored within a firewall system such as iptables) may be maintained at the CPE device for designating which packets are to be rejected. A received DNS request may be rejected by the CPE device when one or more parameters of the DNS request match one or more of the packet parameters designated for a packet that is to be rejected.

At 315, a DNS response that includes a pre-configured IP address may be generated. The DNS response may be generated, for example, by the CPE device (e.g., by the DNS response module 220 of FIG. 2). In embodiments, the DNS response module 220 may extract information (e.g., transport protocol, source identifier, destination identifier, etc.) from the received DNS request and may use the information to generate the DNS response. The CPE device may be configured with a predetermined address (e.g., IP address, domain name, etc.) that is to be utilized by the source of the DNS request in place of the domain name included within the request. For example, a predetermined IP address for redirecting DNS requests may be configured at the redirect address module 225 of FIG. 2, and the DNS response module 220 may insert the predetermined IP address into the DNS response. The DNS response module 220 may insert the predetermined IP address within an answers field of the DNS response packet.

At 320, the DNS response may be output from the CPE device to the client device from which the DNS request was received. In embodiments, the DNS response module may extract the source address from the DNS request and may insert the source address (e.g., the address of the client device from which the DNS request was received) into the DNS response as a destination address. The CPE device may output the DNS response to the client device through the client interface 210 of FIG. 2.

At 325, an HTTP packet may be output from the client device on the IP address that is identified within the DNS response. In embodiments, the HTTP packet that is output from the client device may be routed (e.g., by the CPE device or other device configured to receive and route a packet from the client device) to a targeted server, and the targeted server may output one or more packets to the client device in response to the received HTTP packet. For example, the targeted server may include information for troubleshooting an Internet connection issue that is occurring at the CPE device. The targeted server may be embedded within the CPE device or may be external to the CPE device, and the targeted server may be situated so as to receive an HTTP packet from the client device when a connection between the CPE device and an upstream network (e.g., Internet, WAN 115, etc.) is broken. It should be understood that the targeted server may be configured with other information to be delivered to the client device in response to an HTTP packet being received from the client device.

Figure 4:
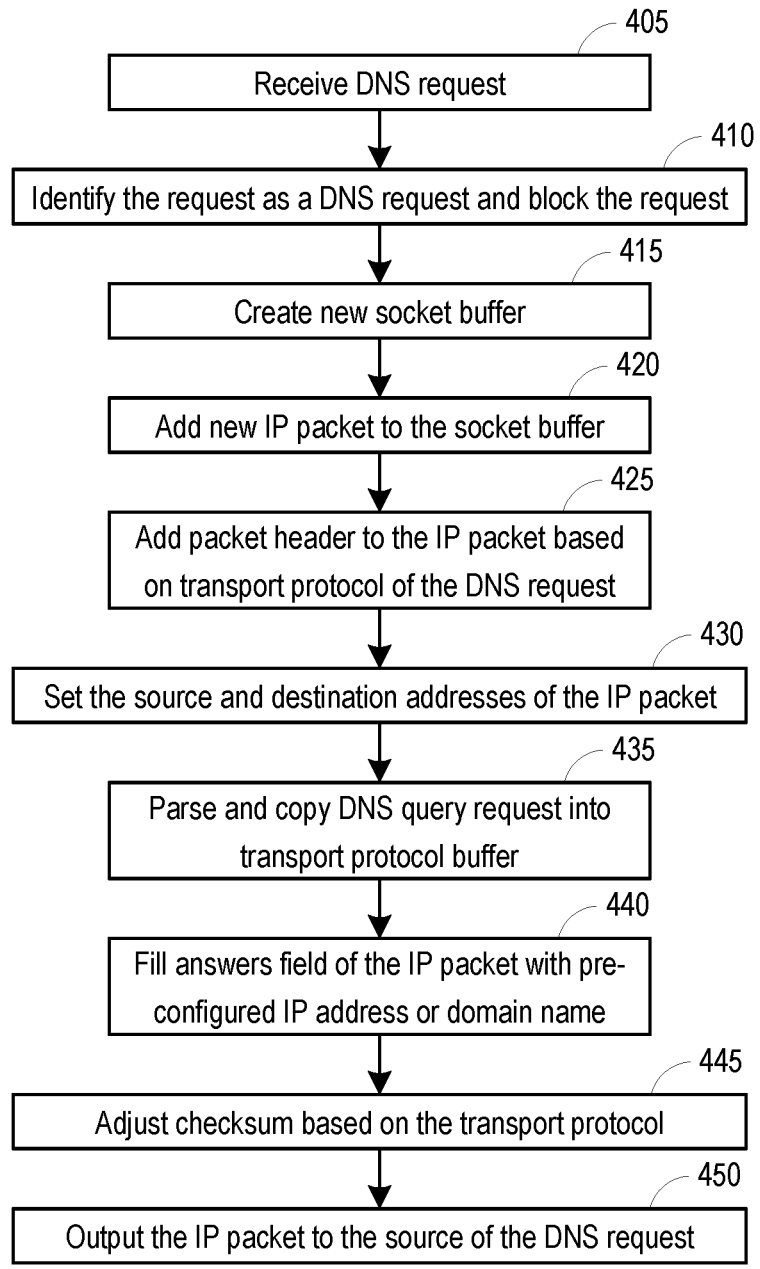
FIG. 4 is a flowchart illustrating an alternate process operable to facilitate the generation and output of a DNS response that includes an identification of a pre-configured IP address or domain name.

FIG. 4 is a flowchart illustrating an alternate process 400 operable to facilitate the generation and output of a DNS response that includes an identification of a pre-configured IP address or domain name. The process 400 may be carried out, for example, by a CPE device 110 of FIG. 1 or any other device configured to communicate with one or more client devices 105 of FIG. 1. The process 400 can begin at 405, when a DNS (domain name system) request is received at a CPE device (e.g., CPE device 110 of FIG. 1 such as a gateway device, STB, standalone modem, or other device having an embedded modem) from a client device (e.g., client device 105 of FIG. 1). In embodiments, the DNS request may include a content source identifier (e.g., a domain name) and may be received at the CPE device through a client interface 210 of FIG. 2.

At 410, the CPE device may identify the received request as a DNS request and may block the request. The request may be identified as a DNS request, for example, by the DNS gate module 215 of FIG. 2. In embodiments, one or more parameters of the received DNS request (e.g., packet) may be checked against one or more packet parameters that are designated for a packet that is to be blocked. For example, a table of packet parameters (e.g., parameters stored at a firewall system such as iptables) may be maintained at the CPE device for designating which packets are to be rejected. A received DNS request may be rejected by the CPE device when one or more parameters of the DNS request match one or more of the packet parameters designated for a packet that is to be rejected.

At 415, a new socket buffer may be created. The new socket buffer may be created, for example, by the CPE device (e.g., the DNS response module 220 of FIG. 2).

At 420, a new IP packet may be added to the socket buffer. The new IP packet may be added to the socket buffer, for example, by the CPE device (e.g., the DNS response module 220 of FIG. 2).

At 425, a packet header may be added to the IP packet based on the transport protocol of the DNS request. The packet header may be added to the IP packet, for example, by the CPE device (e.g., the DNS response module 220 of FIG. 2). In embodiments, the DNS response module 220 may determine the transport protocol of the DNS request by identifying the transport protocol indicated by the DNS request. For example, the DNS response module 220 may add to the IP packet, a packet header that is associated with the transport protocol (e.g., UDP (user datagram protocol), TCP (transmission control protocol), etc.) identified from the DNS request.

At 430, the source and destination addresses of the IP packet may be set. The source and destination addresses of the IP packet may be set, for example, by the CPE device (e.g., the DNS response module 220). In embodiments, the DNS response module 220 may extract the source and destination addresses from the received DNS request, and may insert the source and destination addresses into the IP packet.

At 435, the DNS query request may be parsed and copied into the transport protocol buffer. The DNS query request may be parsed and copied into the transport protocol buffer, for example, by the CPE device (e.g., the DNS response module 220). In embodiments, the DNS response module 220 may parse the DNS request part from the query request and may copy the DNS query request into the created transport protocol buffer.

At 440, the answers field of the IP packet may be filled with a pre-configured IP address or domain name. The answers field of the IP packet may be filled, for example, by the CPE device (e.g., the DNS response module 220). In embodiments, the DNS response module 220 may be configured with, or may retrieve (e.g., from a redirect address module 225 of FIG. 2) an IP address or domain name. For example, the pre-configured IP address or domain name may be an address or domain name of a server that may be reached by the CPE device or client device (e.g., redirect server 230 of FIG. 2, redirect server 235 of FIG. 2, etc.).

At 445, a checksum of the IP packet may be adjusted based on the transport protocol. The checksum may be adjusted, for example, by the CPE device (e.g., the DNS response module 220). In embodiments, the DNS response module 220 may adjust the checksum of the IP packet according to the transport protocol used (e.g., the transport protocol identified from the DNS request at 425).

At 450, the IP packet may be output to the source of the DNS request. For example, the CPE device may output the IP packet, as a DNS response, to the client device through the client interface 210 of FIG. 2.

Figure 5:
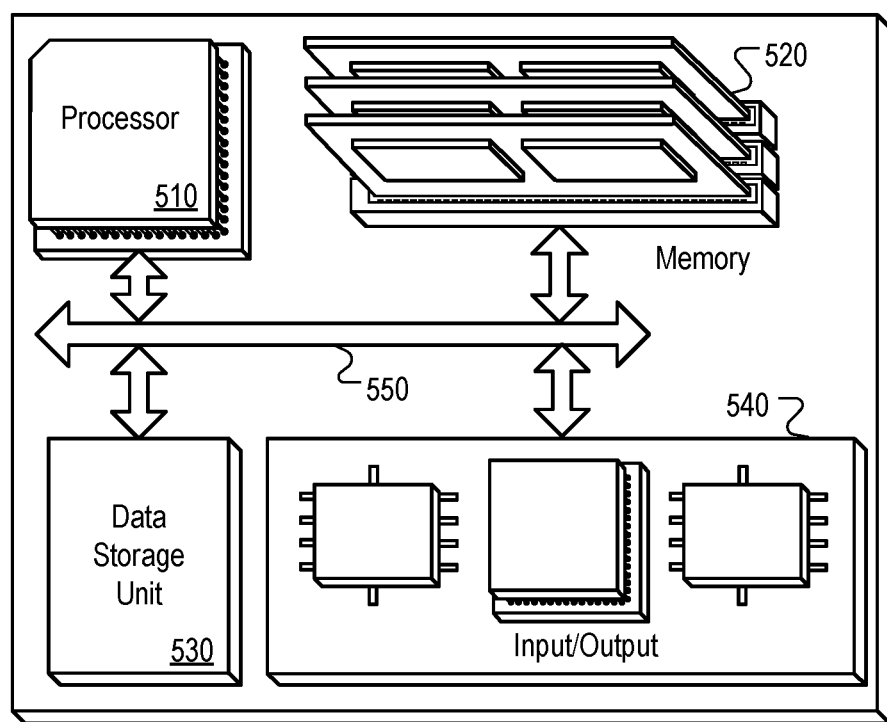
FIG. 5 is a block diagram of a hardware configuration operable to facilitate the spoofing of domain name system requests by a customer premise equipment device.

FIG. 5 is a block diagram of a hardware configuration 500 operable to facilitate the spoofing of domain name system requests by a customer premise equipment device. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In one implementation, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, mobile device, tablet, computer, game console, STB, etc.). In another implementation, the input/output device can include driver devices configured to send communications to, and receive communications from one or more networks (e.g., provider network 120 of FIG. 1, WAN 115 of FIG. 1, local network, etc.).

Those skilled in the art will appreciate that the invention improves upon methods and systems for redirecting a client device from which a DNS request is received. Methods, systems, and computer readable media can be operable to facilitate the spoofing of domain name system requests by a customer premise equipment (CPE) device. The CPE device may detect and block a DNS request received from a client device, and the CPE device may generate a DNS response that includes a pre-configured redirect address. The CPE device may block an identified DNS request when the CPE device is unable to retrieve content associated with the DNS request. The CPE device may output the DNS response to the client device from which the DNS request was received, and in response, the client device may output a request on the pre-configured redirect address that is included within the DNS response. The redirect address may direct the client device to an alternate content source.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
receiving, at a customer premise equipment device, a domain name system request from a client device;
blocking the domain name system request at the customer premise equipment device, wherein the domain name system request is blocked at the customer premise equipment device in response to determining that a connection between the customer premise equipment device and an upstream network is broken, and wherein the customer premise equipment device blocks the domains system request by matching one or more parameters of the domain system request to at least one parameter from a list of packet parameters that is maintained at the customer premise equipment device;
extracting information from the domain name system request;
using the information extracted from the domain name system request to generate a domain name system response;
retrieving a redirect address, wherein the redirect address comprises an address that is associated with a server that is internal to the customer premise equipment device, and the address comprising an identifier associated with specific content stored at the server which is internal to the customer premise equipment device, wherein the specific content comprises troubleshooting information associated with the broken connection between the customer premise equipment device and the upstream network;
inserting the redirect address into the domain name system response; and
outputting the domain name system response to the client device.

2. The method of claim 1, wherein the domain name system response comprises an Internet protocol packet, and wherein the redirect address is input within an answers field of the Internet protocol packet.

3. The method of claim 1, wherein the redirect address is pre-configured at the customer premise equipment device and is retrieved from storage at the customer premise equipment device.

4. The method of claim 1, further comprising:
after outputting the domain name system response to the client device, receiving an HTTP request from the client device, wherein the HTTP request is received on the redirect address.

5. The method of claim 1, wherein the information extracted from the domain name system request comprises an identification of a transport protocol associated with the domain name system request, and wherein generating the domain name system response comprises:
adding an Internet protocol packet to a socket buffer; and
adding a packet header to the Internet protocol packet based on the transport protocol associated with the domain name system request.

6. The method of claim 5, wherein generating the domain name system response further comprises:
adjusting a checksum of the Internet protocol packet based on the transport protocol associated with the domain name system request.

7. A customer premise equipment device that:
receives a domain name system request from a client device;
blocks the domain name system request, wherein the domain name system request is blocked at the customer premise equipment device in response to determining that a connection between the customer premise equipment device and an upstream network is broken, and wherein the customer premise equipment device blocks the domains system request by matching one or more parameters of the domain system request to at least one parameter from a list of packet parameters that is maintained at the customer premise equipment device;
extracts information from the domain name system request;
uses the information extracted from the domain name system request to generate a domain name system response;
retrieves a redirect address, wherein the redirect address comprises an address that is associated with a server that is internal to the customer premise equipment device, and the address comprising an identifier associated with specific content stored at the server which is internal to the customer premise equipment device, wherein the specific content comprises troubleshooting information associated with the broken connection between the customer premise equipment device and the upstream network; and
inserts the redirect address into the domain name system response; and
wherein the one or more interfaces are further configured to be used to output the domain name system response to the client device.

8. The customer premise equipment device of claim 7, wherein the domain name system response comprises an Internet protocol packet, and wherein the redirect address is input within an answers field of the Internet protocol packet.

9. The customer premise equipment device of claim 7, wherein the customer premise equipment device further:
 after outputting the domain name system response to the client device, receives an HTTP request from the client device, wherein the HTTP request is received on the redirect address.

10. The customer premise equipment device of claim 7, wherein the information extracted from the domain name system request comprises an identification of a transport protocol associated with the domain name system request, and wherein generating the domain name system response comprises:
 adding an Internet protocol packet to a socket buffer; and
 adding a packet header to the Internet protocol packet based on the transport protocol associated with the domain name system request.

11. The customer premise equipment device of claim 10, wherein generating the domain name system response further comprises:
 adjusting a checksum of the Internet protocol packet based on the transport protocol associated with the domain name system request.

12. One or more non-transitory computer readable media having instructions operable to cause one or more processors to perform the operations comprising:
 receiving, at a customer premise equipment device, a domain name system request from a client device;
 blocking the domain name system request at the customer premise equipment device, wherein the domain name system request is blocked at the customer premise equipment device in response to determining that a connection between the customer premise equipment device and an upstream network is broken, and wherein the customer premise equipment device blocks the domains system request by matching one or more parameters of the domain system request to at least one parameter from a list of packet parameters that is maintained at the customer premise equipment device;
 extracting information from the domain name system request;
 using the information extracted from the domain name system request to generate a domain name system response;
 retrieving a redirect address, wherein the redirect address comprises an address that is associated with a server that is internal to the customer premise equipment device, and the address comprising an identifier associated with specific content stored at the server which is internal to the customer premise equipment device, wherein the specific content comprises troubleshooting information associated with the broken connection between the customer premise equipment device and the upstream network;
 inserting the redirect address into the domain name system response; and
 outputting the domain name system response to the client device.

13. The one or more non-transitory computer-readable media of claim 12, wherein the domain name system response comprises an Internet protocol packet, and wherein the redirect address is input within an answers field of the Internet protocol packet.

14. The one or more non-transitory computer-readable media of claim 12, wherein the redirect address is pre-configured at the customer premise equipment device and is retrieved from storage at the customer premise equipment device.

15. The one or more non-transitory computer-readable media of claim 12, wherein the instructions are further operable to cause one or more processors to perform the operations comprising:
 after outputting the domain name system response to the client device, receiving an HTTP request from the client device, wherein the HTTP request is received on the redirect address.

16. The one or more non-transitory computer-readable media of claim 12, wherein the information extracted from the domain name system request comprises an identification of a transport protocol associated with the domain name system request, and wherein generating the domain name system response comprises:
 adding an Internet protocol packet to a socket buffer; and
 adding a packet header to the Internet protocol packet based on the transport protocol associated with the domain name system request.

17. The one or more non-transitory computer-readable media of claim 16, wherein generating the domain name system response further comprises:
 adjusting a checksum of the Internet protocol packet based on the transport protocol associated with the domain name system request.

\* \* \* \* \*